T861045

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 22, 1969

861 O.G. 1020

705,283

TEXTILE LUBRICANTS FOR SHAPED CONDENSATION POLYMERS

Hugh Thomas Patterson, Greenville, and Harold James Elliott Segrave, Kinston, N.C., assignors to E. I. du Pont de Nemours and Company, Wilmington, Del., a corporation of Delaware

Filed Feb. 14, 1968. Published Apr. 22, 1969

Class 8—115.5

No Drawing. 12 Pages Specification

Condensation polymer fibers or films are lubricated with a mixture of about 2 to 16 percent by weight of an isocyanate-modified polydimethylsiloxane and the remainder being polydimethylsiloxane. The polydimethylsiloxanes used for preparing the lubricant are known as silicone oils. In spandex fibers the best results are obtained with polydimethylsiloxanes of viscosities of up to 1,000 centipoise at 25° C. Other fibers which may be so lubricated include nylons, polyesters, and polyacrylonitriles. Segmented copolymers of the spandex type which have reactive sites on their surface form chemical bonds with the isocyanate groups in the lubricant, thus effecting good adhesion of the lubricant to the fiber. The described lubricant provides excellent frictional characteristics without fiber yellowing.